US006195234B1

(12) United States Patent
Sundaram et al.

(10) Patent No.: US 6,195,234 B1
(45) Date of Patent: Feb. 27, 2001

(54) MAGNETIC DISCS WITH RAISED FEATURES IN THE CLAMPING AREA

(75) Inventors: Ramesh Sundaram, Fremont, CA (US); John L. Brand; Subrahmanyan Nagarajan, both of Burnsville, MN (US); James Rex Staggers, Jr., Longmont; Walter Wong, Boulder, both of CO (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/133,720

(22) Filed: Aug. 13, 1998

Related U.S. Application Data (63) Continuation-in-part of application No. 08/897,855, filed on Jul. 21, 1997, now Pat. No. 5,838,516.
(60) Provisional application No. 60/055,937, filed on Aug. 15, 1997.

(51) Int. Cl.$^7$ .............................. G11B 5/82; G11B 17/02
(52) U.S. Cl. ...................................... 360/135; 360/99.12
(58) Field of Search ................................ 360/135, 99.12, 360/98.08

(56) References Cited

U.S. PATENT DOCUMENTS

| 4,939,615 | * | 7/1990 | Shirakura | 360/135 |
| 5,062,021 | | 10/1991 | Ranjan et al. | 360/135 |
| 5,108,781 | | 4/1992 | Ranjan et al. | 427/53.1 |
| 5,274,517 | | 12/1993 | Chen | 360/98.08 |
| 5,295,030 | | 3/1994 | Tafreshi | 360/99.12 |
| 5,388,020 | * | 2/1995 | Nakamura | 360/135 |
| 5,452,157 | | 9/1995 | Chow et al. | 360/98.08 |
| 5,490,022 | | 2/1996 | Hoshina et al. | 360/98.08 |
| 5,875,171 | * | 2/1999 | Albrecht | 360/99.12 |

FOREIGN PATENT DOCUMENTS 7-169226   7/1995   (JP) .............................. G11B/23/00

* cited by examiner

*Primary Examiner*—A. J. Heinz
(74) *Attorney, Agent, or Firm*—Schwegman, Lundberg, Woessner & Kluth, P.A.

(57) ABSTRACT

A disc drive, includes a base, a disc stack rotatably attached to the base, and an actuator assembly movably attached to the base. The actuator assembly also includes a bearing housing, head mounting arms, head suspensions attached to the head mounting arms and a head assembly attached to the head suspension. The disc drive also includes a hub having a cylindrical body. The hub includes a disc mounting flange on one end of the hub. A disc has an opening therein sufficient to allow the hub to fit within the opening of the disc. The disc has two substantially flat data surfaces. The disc also includes a disc clamping portion located near the opening in the disc. A clamp is used to attach the disc to the hub. At least one disc is placed onto the hub and onto the mounting flange of the hub. The clamp is then used to clamp the disc to the hub. The disc clamping portion includes features for accommodating differences in flatness between the disc surfaces, the mounting flange of the hub and the clamp. The features include a first raised feature which extends above the first data surface of the disc, and a second raised feature which extends above the second data surface of the disc. The features are either bumps or annular rings positioned on the disc mounting surface. The bumps or rings may be formed using a laser. The ring may also include a multiplicity of individual bumps. As the disc is clamped to the hub, the raised feature deforms to accommodate the mismatch in flatness between the disc surfaces, the mounting flange of the hub, and the clamp. The clamp may include a roughened disc clamping surface. The upper surface of the disc mounting flange may also be roughened.

20 Claims, 8 Drawing Sheets

MAGNETIC DISCS WITH RAISED FEATURES IN THE CLAMPING AREA

RELATED APPLICATIONS

This application claims the benefit of U.S. Provisional Application Ser. No. 60/055,937, filed Aug. 15, 1997 under 35 USC §119(e). Furthermore, this application is a Continuation in Part of U.S. patent application Ser. No. 08/897,855, filed Jul. 21, 1997, now issued as U.S. Pat. No. 5,838,516 on Nov. 17, 1998, entitled "High Friction/Lower Clamping Force Mechanism of Discs in a Disc Drive".

FIELD OF THE INVENTION

The present invention relates to the field of mass storage devices. More particularly, this invention relates to a disc drive which includes a disc having a raised features on the clamping area portion of the disc.

BACKGROUND OF THE INVENTION

This invention relates generally to the field of disc drive data storage devices, or disc drives, and more particularly, but not by way of limitation, to an improved system for mounting the discs in a disc drive.

Disc drives of the type known as "Winchester" disc drives or hard disc drives are well known in the industry. Such disc drives record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM. Higher spindle motor speeds are contemplated for the future.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator housing is mounted to the pivot shaft by an arrangement of precision ball bearing assemblies or a flex pivot and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

Disc drives of the current generation are included in desk-top computer systems for office and home environments, as well as in laptop computers which are used wherever their users happen to take them. Because of this wide range of operating environments, the computer systems, as well as the disc drives incorporated in them, must be capable of reliable operation over a wide range of ambient temperatures.

Furthermore, laptop computers in particular can be expected to be subjected to large amounts of mechanical shock as they are moved about. It is common in the industry, therefore, that disc drives be specified to operate over ambient temperature ranges of from −5° C. to 60° C., and further be specified to be capable of withstanding mechanical shocks of 100 G or greater without becoming inoperable.

One of the areas of disc drive design which is of particular concern when considering ambient temperature variations and mechanical shock resistance is the system used to mount the discs to the spindle motor. During manufacture, the discs are mounted to the spindle motor in a temperature- and cleanliness-controlled environment. Once mechanical assembly of the disc drive is completed, special servo-writers are used to prerecord servo information on the discs. This servo information is used during operation of the disc drive to control the positioning of the actuator used to move the read/write heads to the desired data location in a manner well known in the industry. Once the servo information has been recorded on the discs, it is assumed by the servo logic that the servo information, and all data subsequently recorded, are on circular tracks that are concentric with relation to the spin axis of the spindle motor. The discs, therefore, must be mounted to the spindle motor in a manner that provides sufficient clamping force to prevent shifting of the discs relative to the spindle motor due to differential thermal expansion of the discs and motor components over the specified temperature range, or due to mechanical shock applied to the host computer system.

Several systems for clamping of the discs to the spindle motor have been described in U.S. Patents, including U.S. Pat. No. 5,452,157, issued Sep. 19, 1995, U.S. Pat. No. 5,274,517, issued Dec. 28, 1993 and U.S. Pat. No. 5,295,030, issued Mar. 15, 1994, all assigned to the assignee of the present invention and all incorporated herein by reference. In each of these incorporated disc clamping systems, the spindle motor of the disc drive includes a disc mounting flange extending radially from the lower end of the spindle motor hub. A first disc is placed over the hub during assembly and brought to rest on this disc mounting flange. An arrangement of disc spacers and additional discs are then alternately placed over the spindle motor hub until the intended "disc stack" is formed. Finally, some type of disc clamp is attached to the spindle motor hub which exerts an axial clamping force against the uppermost disc in the disc stack. This axial clamping force is passed through the discs and disc spacers and squeezes the disc stack between the disc clamp and the disc mounting flange on the spindle motor hub.

From the above description, it would appear that the only element that would need to be considered when designing a disc clamping system would be the disc clamp, with any requirement for additional clamping force being met by an increase in the strength of the disc clamp. However, with the industry trend of size reduction in the overall disc drive, the size of various components within the disc drive has also been reduced, including the thickness of the discs. As the discs have grown thinner, the amount of clamping force that can be applied to the discs without causing mechanical distortion of the discs has also fallen. That is, due to inescapable tolerance variation in the flatness of the disc clamping flange on the spindle motor, the discs themselves and the disc spacers between adjacent discs, as well as the yield strength of the disc material, only a finite amount of axial clamping force can be applied to the inner diameters of the discs before the desired flatness of the disc surfaces is lost.

A need clearly exists, therefore, for a disc clamping system which provides a high resistance to radial shifting of the discs relative to the spindle motor hub, while still maintaining an axial load force that is low enough to prevent mechanical distortion of the discs themselves.

Differences in the flatness due to tolerance variations of the disc clamping flange on the spindle motor, the discs themselves, and the disc spacers between adjacent discs, as well as the yield strength of the disc material is also one of the causes of distortion of discs in a disc stack. The flatness mismatch between the mating surfaces, namely the discs, disc spacer, the spindle hub, and the clamp can cause global distortions on the disc which in turn effects the flatness of the disc. The disc surfaces become cupped or coned, saddle shaped, or even become distorted in higher modes such as potato chipping. As the disc stack is assembled, the flatness of the discs are distorted. When potato chipped, the disc actually becomes wavy at the inner diameter and the disc's shape resembles a potato chip. These distortions emerge as the disc stack is assembled and the mating surfaces of the disc attempt to accommodate the differences in flatness of the other components of the disc drive.

Any distortion due to clamping is undesirable. The slider and transducer do not maintain a constant fly height in the presence of distortions. For example, when the disc distorts to resemble a potato chip the fly height varies. A valley causes the slider and attached transducer to fly low while a hill causes the slider and attached transducer to fly high. In the presence of a coning or cupping type disc distortion, the fly height is too high on one side of the disc and too low on the other side of the disc. The fly height may be constant but will vary from the nominal, designed fly height.

Ideally, the height between the transducer and disc should be uniform. When disc distortions occur on a disc, the fly height varies and the data channel must compensate for the variation in the signal from the transducer. The variation in fly height is more of a problem when a magneto-resistive ("MR") head is used as the read element in a disc drive. Disc distortions also press the limits of the allowable head disc spacing margin and may affect the reliability and capacity of the disc drive.

As a result, there is a need for a disc clamp and clamping method which minimizes disc distortion while also minimizing the amount of height needed to accommodate the clamp. There is also a need for a disc that can be used that will accommodate some of the tolerance mismatches of the other components of the disc stack while minimizing the disc distortions which effect the flatness of the data surfaces of the disc or discs. In other words there is a need for a disc which will allow for better control of the disc geometry that results from assembling the disc into a disc stack. There is also a need for a disc and disc stack in which the tolerances of the spacing rings and clamps could be made less stringent so that the cost associated with the various components would be less. In addition, there is a need for a manufacturing process that requires less stringent tolerances on the clamping force, so as to ease the cost of assembly.

BRIEF SUMMARY OF THE INVENTION

A disc drive, includes a base, a disc stack rotatably attached to the base, and an actuator assembly movably attached to the base. The actuator assembly also includes a bearing housing, head mounting arms, head suspensions attached to the head mounting arms and a head assembly attached to the head suspension. The disc drive also includes a hub having a cylindrical body. The hub includes a disc mounting flange on one end of the hub. A disc has an opening therein sufficient to allow the hub to fit within the opening of the disc. The disc has two substantially flat data surfaces.

The disc also includes a disc clamping portion located near the opening in the disc. A clamp is used to attach the disc to the hub. At least one disc is placed onto the hub and onto the mounting flange of the hub. The clamp is then used to clamp the disc to the hub. The disc clamping portion includes features for accommodating differences in flatness between the disc surfaces, the mounting flange of the hub and the clamp. The features include a first raised feature which extends above the first data surface of the disc, and a second raised feature which extends above the second data surface of the disc. The features are either bumps or annular rings positioned on the disc mounting surface. The bumps or rings may be formed using a laser. The ring may also include a multiplicity of individual bumps.

As the disc is clamped to the hub, the raised feature deforms to accommodate the mismatch in flatness between the disc surfaces, the mounting flange of the hub, and the clamp. The clamp may include a roughened disc clamping surface. The upper surface of the disc mounting flange may also be roughened.

A method for clamping a disc to the spindle hub includes forming a raised feature on the disc clamping portion of the disc, applying an axial load to the clamp, disc and hub flange until the raised feature deforms, and clamping the disc to the hub. The axial load is applied to the clamp, disc and hub flange until the raised feature deforms elastically. Clamping the disc to the hub includes heating clamp, and holding the clamp with respect to the hub while applying the axial load until the clamp shrink fits onto the hub. Forming the raised feature on the disc clamping portion of the disc includes directing a laser at the disc clamping portion of the disc.

Advantageously, the disc having raised features minimizes disc distortion resulting from clamping while also minimizing the amount of height of the disc stack. The raised features accommodate some of the tolerance mismatches of the other components of the disc stack. The result is that the disc distortions which effect the flatness of the data surfaces of the disc or discs are minimize. The raised features also allow for better control of the disc geometry results from assembling the disc into a disc stack. The raised features also allow the tolerances of the spacing rings and clamps to be made less stringent so that the cost associated with the various components are less. In addition, the control of the manufacturing process for assembling the disc stack is less stringent so the cost of assembly is also reduced.

The present invention also provides an improved disc clamping system for the discs in a disc drive which increases the coefficient of friction between the elements of the disc stack in the area of the disc mounting flange of the spindle motor, the disc spacers, the disc clamp and the mounting portion of the discs. The increase in the coefficient of friction is achieved by controlling the surface texture of either the disc mounting flange on the spindle motor hub, the disc spacers, the disc clamp, the mounting portion of the discs themselves, or a combination of these elements. In the presently preferred embodiment, the surface of particular elements in the disc stack is selected to have an average roughness of approximately 12 μinches. The desired average surface roughness of selected disc stack elements is achieved by any of a number of processes appropriate to the specific components.

It is an object of the invention to provide a disc clamping system with improved resistance to radial shifting of the discs relative to the spindle motor hub due to temperature variations or mechanical shock.

It is another object of the invention to provide this improved resistance to radial shifting of the discs while still maintaining an axial clamping force which is low enough to prevent mechanical distortion of the discs.

It is another object of this invention to provide a disc clamping system that includes minimizes the amount of disc distortion that results from the process of assembling a disc stack.

It is another object of the invention to provide a disc clamping system which is highly consistent in a high volume manufacturing environment.

It is another object of the invention to provide a disc clamping system which is inexpensive and adds minimal cost to the manufacture of the disc drive.

The manner in which these objects are achieved, as well as other features and benefits of the invention, can best be understood by a review of the following DETAILED DESCRIPTION OF THE INVENTION, when read in conjunction with an examination of the accompanying drawings.

DETAILED DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

The invention described in this application is useful with all mechanical configurations of disc drives having either rotary or linear actuation. In addition, the invention is also useful in all types of disc drives including hard disc drives, zip drives, floppy disc drives and any other type of drives where a disc stack is assembled.

Figure 1:
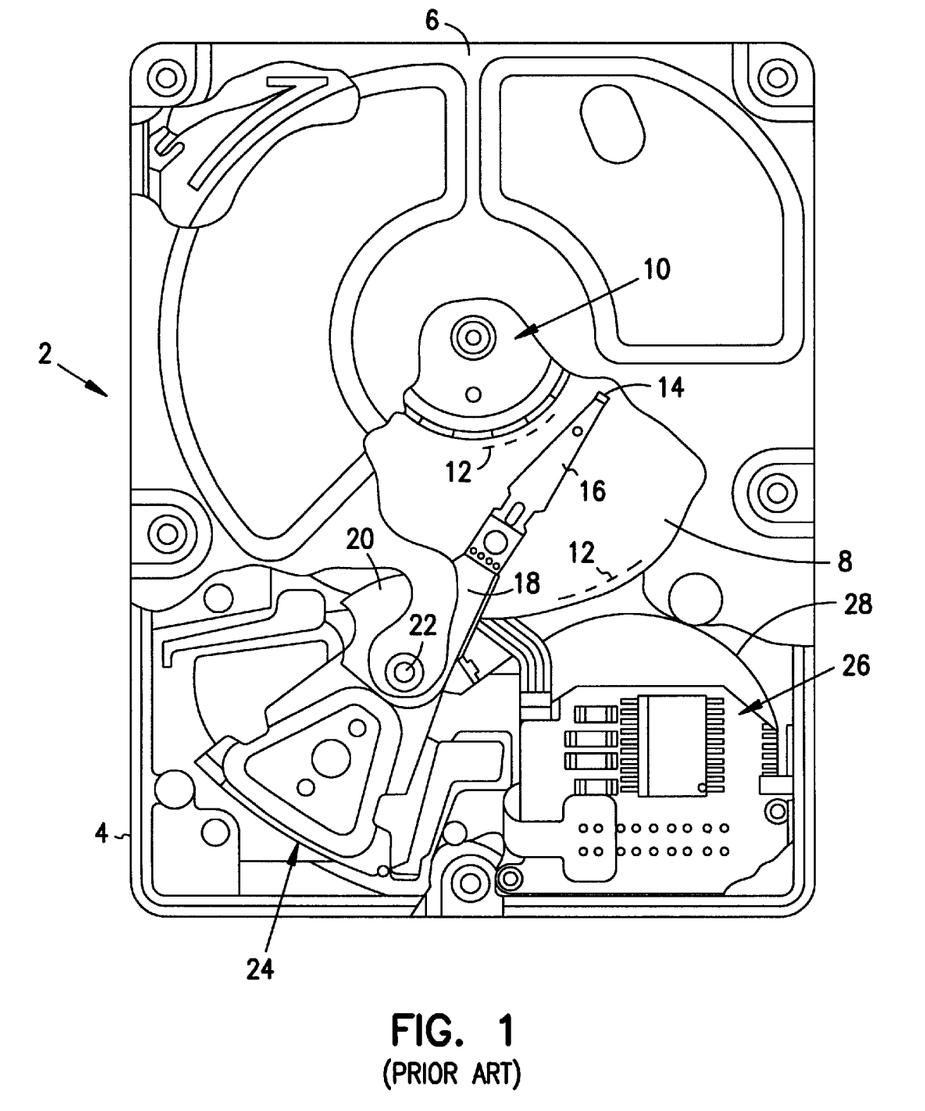
FIG. 1 is a top plan view of a disc drive in which the present invention is particularly useful.

Turning now to the drawings and specifically to FIG. 1, shown is a typical prior art disc drive 2 in which the present invention is particularly useful. The disc drive 2 includes a base member 4 to which all other components are directly or indirectly mounted and a top cover 6 (shown in partial cutaway) which, together with the base member 4, forms a disc drive housing enclosing delicate internal components and isolating these components from external contaminants.

The disc drive includes a plurality of discs 8 which are mounted for rotation on a spindle motor shown generally at 10. The discs 8 include on their surfaces a plurality of circular, concentric data tracks, the innermost and outermost of which are shown by dashed lines at 12, on which data are recorded via an array of vertically aligned head assemblies (one of which is shown at 14). The actuator bearing housing 20, the head mounting arms 18, and the assemblies 14 are all part of an actuator assembly 19. The head assemblies 14 are supported by head suspensions, or flexures 16, which are attached to actuator head mounting arms 18. The actuator head mounting arms 18 are integral to an actuator bearing housing 20 which is mounted via an array of ball bearing assemblies (not designated) for rotation about a pivot shaft 22.

Power to drive the actuator bearing housing 20 in its rotation about the pivot shaft 22 is provided by a voice coil motor (VCM) shown generally at 24. The VCM 24 consists of a coil (not separately designated) which is supported by the actuator bearing housing 20 within the magnetic field of an array of permanent magnets (also not separately designated) which are fixedly mounted to the base member 4, all in a manner well known in the industry. Electronic circuitry (partially shown at 26, generally, and partially carried on a printed circuit board (not shown)) to control all aspects of the operation of the disc drive 2 is provided, with control signals to drive the VCM 24, as well as data signals to and from the heads 14, carried between the electronic circuitry and the moving actuator assembly via a flexible printed circuit cable (FCC) 28.

Figure 2:
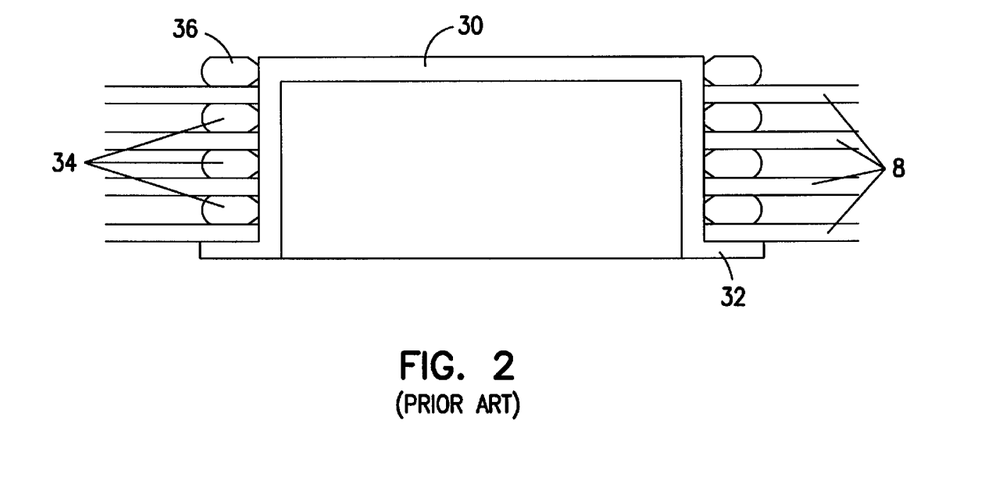
FIG. 2 is a simplified diagrammatic sectional view of a typical prior art disc drive spindle motor and disc stack, showing a typical prior art disc clamping system.

Turning now to FIG. 2, shown is a simplified diagrammatic sectional elevation view illustrating a prior art disc clamping system. The figure shows a hub 30 for a spindle motor. As can be seen, the hub 30 is in the form of a hollow cylinder closed at the top and includes a radially extending disc mounting flange 32 at its lower end. As will be appreciated by persons of skill in the art, the motor components (not shown) necessary to rotate the hub 30 will be contained within or near the hub 30.

A plurality of discs 8 are shown mounted on the hub 30. The lowermost of the discs 8 is shown with its innermost extent resting on the disc mounting flange 32.

The figure also shows a plurality of disc spacers 34 interspersed between adjacent discs 8. The vertical dimension of the disc spacers 34 is selected to provide adequate spacing between adjacent discs 8 for a back-to-back arrangement of read/write heads (not shown) oriented to cooperate with facing surfaces of the discs 8 in a manner well known in the art, while the inner diameter of the disc spacers 34 is selected to fit closely over the hub 30.

FIG. 2 also shows a disc clamp 36 engaging the uppermost disc 8 and the outer diameter of the uppermost portion of the hub 30. The disc clamp 36 is of the type known as a "shrink-fit" clamp. That is, the inner diameter of the disc clamp 36 is nominally smaller than the outer diameter of the hub 30. During assembly, the disc clamp 36 is heated to cause it to expand, and then placed over the hub 30 into contact with the uppermost disc 8. The desired amount of axial clamping force is then applied to the disc clamp 36 in the direction of the discs 8, and the disc clamp 36 is allowed to cool and contract into contact with the outer diameter of the hub 30. Selection of the materials of the disc clamp 36 and hub 30, along with careful control of the nominal dimensions of these components, allows precise control of the clamping force exerted on the disc stack. For details of such a shrink-fit disc clamping system, the reader is directed to previously incorporated U.S. Pat. No. 5,452,157.

It should be noted that, while the figure shows a disc stack comprised of four discs 8 and three disc spacers 34, the number of discs 8 and disc spacers 34 can be either less than or greater than the numbers shown, as is well known in the industry.

Figure 3:
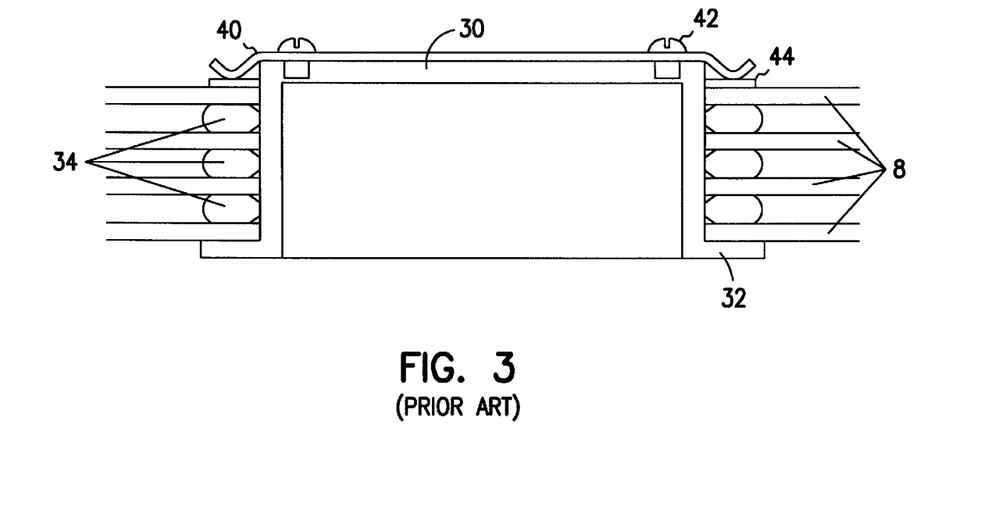
FIG. 3 is a simplified diagrammatic sectional view of a typical prior art disc drive spindle motor and disc stack, showing a second typical prior art disc clamping system.

Turning now to FIG. 3, shown is a simplified diagrammatic sectional elevation view, similar to that of FIG. 2, showing a second prior art disc clamping system. FIG. 3 shows a spindle motor hub 30 incorporating a disc mounting, flange 32 similar to that shown in FIG. 2, and a stack of discs 8 and disc spacers 34, also similar to those of FIG. 2.

FIG. 3 shows a disc clamp 40 of the type known in the industry as a "spring clamp". Such spring disc clamps 40 are typically formed from flat sheet stock having the desired spring characteristics and include circumferential corrugations closely adjacent the outer diameter of the disc clamp which form a contact surface (not designated) for exerting force to the disc stack when a plurality of screws 42 are assembled through the disc clamp 40 into threaded holes (also not designated) in the hub 30. It is also typical for disc clamping systems incorporating such spring disc clamps 40 to include a washer member 44 between the contact surface of the disc clamp 40 and the upper surface of the uppermost disc 8. This washer member 44 aids in evenly distributing the clamping force of the disc clamp 40 about the circumference of the mounting portion of the discs 8 and allows for slip contact between the contact surface of the disc clamp 40 and the washer member 44 when the screws 42 are tightened, thus preventing the exertion of radial stresses directly to the uppermost disc 8.

Selection of the material and geometry of the disc clamp 40 will determine the amount of axial clamping force exerted by the disc clamping system of FIG. 3, as will be appreciated by persons of skill in the art. Details of typical disc clamping systems incorporating a spring clamp such as that of FIG. 3 can be found in previously incorporated U.S. Pat. Nos. 5,274,517 and 5,295,030.

Figure 4:
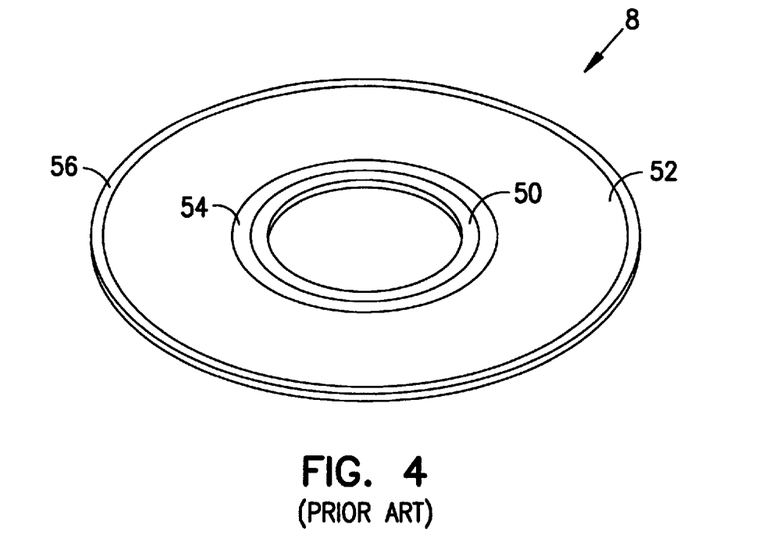
FIG. 4 is a perspective view of a disc for a disc drive identifying specific areas of the disc surface.

Before proceeding further, it would perhaps be best to discuss the layout and usage of the various areas on the surface of a typical recording disc. FIG. 4 shows a perspective view of a typical disc 8. The disc 8 includes, closely adjacent its central opening (not designated), a disc clamping area 50. This disc clamping area 50 corresponds generally to the radial extent of the disc mounting flange 32 and disc spacers 34 of FIGS. 2 and 3 described above, and represents that area of the disc 8 to which the clamping force is applied.

The majority of the disc 8 comprises the data recording area 52, sometimes also referred to as the data band. This is the portion of the disc surface on which user data, as well as the previously mentioned servo information, are recorded.

Between the innermost extent of the data band 52 and the outermost extent of the disc clamping area 50 is a head landing zone 54, sometimes also called a parking zone. When power is removed from the disc drive, it is common practice to move the read/write heads to this head landing zone 54 and allow the heads to come to rest. This minimizes the start torque requirement of the spindle motor to begin spinning, the discs when power is restored to the disc drive, as is well known in the industry. In disc drives incorporating the voice coil actuator common to the current generation of disc drive products, a latching mechanism is used to hold the heads at the head landing zone 54 until the disc drive is powered up. Some disk drives do not use a landing zone. In these disk drives the heads are unloaded onto a ramp adjacent the disk and loaded from a ramp adjacent the disk.

Finally, beyond the outermost extent of the data band 52 is a small outer guard band 56. The disc drive is incapable of utilizing this outer guard band 56 for the storage of data, since the slider which carries the data transducer is unable to fly to the extreme edge of the disc 8.

In disc drives of the current generation, the heads fly above the disc surface at a height of approximately 1.5 $\mu$inches, and disc drive products currently under development will employ head flying heights of 1 $\mu$inch or less. In order to reliably operate with the heads and disc surfaces in such proximity, it is common to specify disc recording media with average surface roughness in the data band 52 of 0.2 to 0.5 $\mu$inches.

Similarly, the air bearing surfaces of the sliders which carry the read/write transducers are specified to have a very smooth surface. It is a well known phenomenon in the industry, however, that if heads having extremely smooth air bearing surfaces are brought to rest on disc surfaces of similar smoothness, a condition known as "stiction" occurs. Stiction is the tendency of the heads and discs to stick together at the point of contact, resulting in difficulty in starting the spindle motor. To obviate the tendency toward stiction, it is common practice in the industry to texture the disc surface in the area of the head landing zone 54. Such texturing can be accomplished by abrasive methods or by melting small craters in the disc surface through the use of a precision laser. In discs of the current generation, abrasive texturing of the head landing zone 54 results in an average surface roughness in the head landing zone 54 of approximately 12 $\mu$inches. The use of laser texturing in the landing zones of typical discs of the current technology results in crater-like pits having a nominal diameter of 10.6±3 microns and a height of 185±50 Angstroms. These pits are spaced on an average of approximately 20 to 50 microns apart, with specifics of pit dimensions and spacing being selected on the basis of desired tribology and limits on head/disc interference. Details concerning the use of lasers for selectively texturing portions of recording discs can be found in U.S. Pat. No. 5,062,021, issued Oct. 29, 1991 and U.S. Pat. No. 5,108,781, issued Apr. 28, 1992, both assigned to the assignee of the present invention and incorporated herein by reference.

In order to prevent mechanical distortion of the discs 8 when the disc stack is assembled on the spindle motor and the intended clamping force is applied by the disc clamp, the flatness and parallelism of the surfaces of the disc spacers (34 in FIGS. 2 and 3) must be closely maintained. It is common in the industry to specify an allowable range of surface roughness on the contact surfaces of the disc spacers to prevent the concentration of the clamping force at a "high" point, with attendant lower clamping force at other positions around the disc clamp. It has been found that, in order to maximize the flatness of the disc spacer surfaces, manufacturers have applied a "mirror-smooth" surface to the contact surfaces of the disc clamps. This mirror-smooth surface has typically resulted in average surface roughnesses that lie at the extreme lower end of the allowable surface roughness range. While this practice has produced disc clamps with the desired flatness, it has incidentally brought about one of the problems to which the present invention is directed.

With the disc clamps (36 and 40 in FIGS. 2 and 3, respectively) and disc spacers (34 in FIGS. 2 and 3) having an extremely smooth surface and the discs 8 also having extremely smooth surfaces in the clamping area (50 in FIG. 4), a very low coefficient of friction results between elements of the disc stack. This low coefficient of friction results in the possibility that the discs will be able to shift from their intended concentric relationship with the hub of the spindle motor as a result of mechanical shock applied to the disc drive, even if the applied mechanical shock is well within the specified range for the disc drive. If the discs are allowed to shift in such a manner, the servo data patterns which are recorded on the discs during manufacture would also be shifted, and such a shift of the servo data relative to the spindle motor hub would place a heavy load on the servo electronics to maintain track following precision. Indeed, in a disc drive utilizing a dedicated servo system, the servo disc could be shifted away from its intended vertical alignment with the data tracks on other discs, thus rendering the disc drive inoperative. It has been found during the volume production of one particular disc drive, for instance, that the discs could be shifted by the radial application of as little as 5 pounds of force, while the intent of the disc drive designers was that the discs be immovable by applied forces less than 20 pounds. When this situation was investigated, the fault was found to be extremely low friction between the discs and the disc spacers.

Furthermore, it has been calculated that having such a low coefficient of friction between the discs and the disc spacers increases the possibility that differential thermal expansion of these and other related components over the specified operating temperature range of the disc drive could also result in the discs being shifted away from their intended concentric relationship with the spindle motor spin axis. Such differential thermal expansion is brought about because the discs, disc spacers, spindle motor hub and disc clamp are fabricated from different materials.

Clearly, one potential solution to this problem would be to increase the clamping force applied to the disc stack by the disc clamp. However, several factors in the disc drive design argue against such an approach.

Firstly, increasing the clamping force on the disc stack could potentially lead to the distortion of the disc mounting flange on the spindle motor hub, with accompanying undesirable variation in the clamping force distribution. If the spindle motor disc mounting flange were to be strengthened to counter this tendency, it would have to be made thicker in the vertical axis of the disc drive, which would serve to lessen the amount of the disc drive's vertical dimension which could be utilized for the discs and read/write heads. Since the vertical space allotted to these functional components is necessary to maximize the number of heads and discs—and thus the total data capacity of the disc drive—any engineering compromise that increased the vertical height of the spindle motor disc mounting flange and reduced the vertical envelope available to the heads and discs would also be avoided if at all possible.

Secondly, increasing the clamping force applied to the disc stack can lead to distortion of the discs themselves, also potentially rendering the disc drive inoperative.

For these and other reasons known to those of skill in the art, increasing the amount of clamping force applied to the disc stack is an impractical solution to the problem of disc shifting noted above.

The present invention resolves the problem described by controllably increasing the coefficient of friction between the elements of the disc stack, so that the same amount of clamping force axially applied by the disc clamp results in increased resistance to radial shifting of the discs. This increase in the coefficient of friction between disc stack components is achieved by controllably increasing the surface roughness of the contact surfaces of the disc clamps, the contact surface of the spindle motor disc mounting flange, the contact surface of the disc clamp or the disc clamping area of the discs themselves. In another aspect of the present invention, the controlled increase in average surface roughness is provided on a combination of these elements.

Several methods of increasing the surface roughness of the various disc stack components are presently envisioned by the invention, with certain of the methods being particularly well suited to specific components, as will be discussed below.

Figure 5:
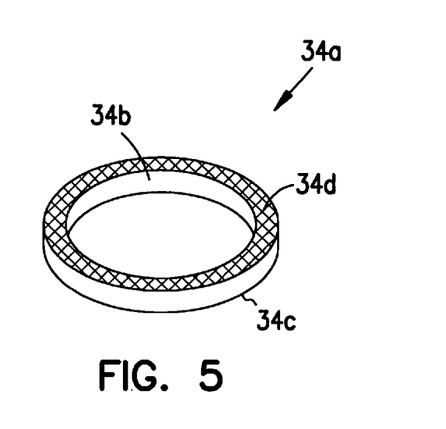
FIG. 5 is a top perspective view of a disc spacer for a disc drive which is modified in accordance with one aspect of the present invention.

Turning to FIG. 5, shown is a disc spacer 34a which has been modified in accordance with one aspect of the present invention. The disc spacer 34a includes a cylindrical inner surface 34b, which is dimensioned to fit as closely over the cylindrical spindle motor hub (30 in FIGS. 2 and 3) as is consistent with manufacturing ease, in order that the disc spacers be substantially concentric with the spindle motor hub. To further assist in assembly, the circular edges 34c at both the inner and outer diameter of the disc clamp 34b are frequently beveled or radiused.

The disc spacer 34a also includes upper and lower disc contact surfaces, the upper of which is designated 34d in the figure. The present invention envisions that these disc contact surfaces 34d will be formed with an average surface roughness of about 12 micro inches.

To achieve the necessary flatness and roughness, it has been found that the disc contact surfaces 34d can first be machined and polished to a flat, mirror-like finish and then burnished or lapped with a closely controlled abrasive. The disc spacer of the present invention can be formed of aluminum, and the selection of an abrasive tape having an appropriate roughness, as can be determined by one of skill in the art, serves well to achieve the desired average surface roughness. Other materials for the disc spacer and the process for achieving the desired average surface roughness could, however, be used, and the scope of the invention is not considered by the inventors to be limited in this regard.

A second method which could be utilized to achieve the desired average surface roughness of the disc contact surfaces 34$d$ of the disc spacer 34$a$ is etching. It is well within the level of skill in the etching art to achieve an average surface roughness of the desired order through the control of well known process variables, such as etchant composition, processing time, temperature, etc. Furthermore, the process of etching the disc contact surfaces 34$d$ of the disc spacer 34$a$ can be performed without deleterious effect on the inner surface 34$b$ of the disc spacer 34$a$ if normal competent engineering considerations are made.

Either of the two described methods for achieving the desired average surface roughness on the disc contact surfaces 34$d$ of the disc spacer 34$a$ are readily implemented in high volume manufacturing environments, and can be realized with a minimal cost impact.

Figure 6:
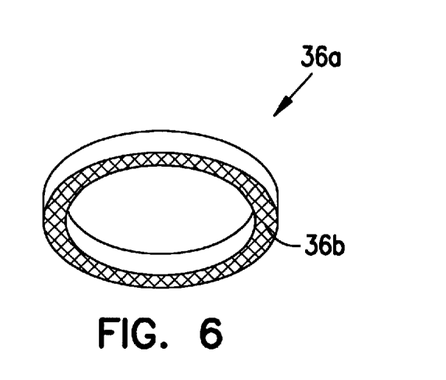
FIG. 6 is a bottom perspective view of a shrink-fit disc clamp which is modified in accordance with a second aspect of the present invention.

In a second aspect of the present invention, similar manufacturing processes can be used to control the average surface roughness of the disc contact surface of the disc clamp. FIG. 6 shows a shrink-fit disc clamp 36$a$, of the type described in relationship to FIG. 2 above, which has been modified in accordance with the present invention. The modified shrink-fit disc clamp 36$a$ includes a disc contact surface 36$b$, whose average surface roughness is selected and controlled in a manner similar to that described above in relationship to the modified disc spacer 34$a$ of FIG. 5. The process used to achieve the desired average surface roughness on the disc contact surface 36$b$ of the modified disc clamp 36$a$ can be the as that selected to control the average surface roughness of the disc contact surfaces 34$d$ of the modified disc spacer 34$a$, since the modified disc clamp 36$a$ is substantially identical to the modified disc spacer 34$a$ of FIG. 5, except for having an inner diameter selected to provide an interference fit with the outer diameter of the spindle motor hub.

If the disc clamp is of the spring type described in relationship to FIG. 3 above, the surface of the washer (44 in FIG. 3) that contacts the clamping portion (50 in FIG. 4) of the uppermost disc surface can also be manufactured with a controlled average surface roughness by methods such as those described above.

Figure 7:
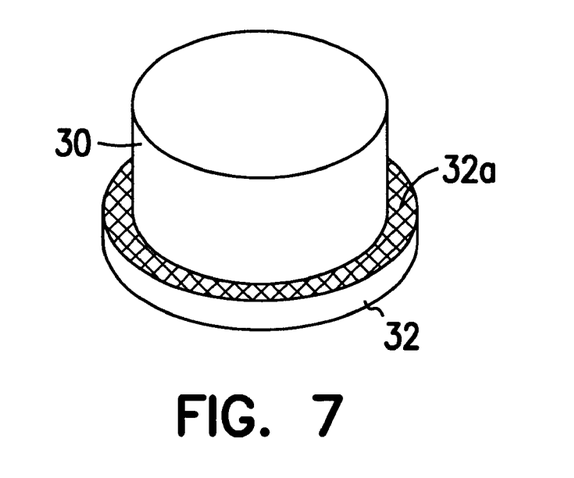
FIG. 7 is a perspective view of a spindle motor hub which is modified in accordance with a third aspect of the present invention.

A third component of the disc stack with which another aspect of the present invention can be implemented is the hub of the spindle motor. As shown in FIG. 7, the spindle motor hub 30 includes a radially extending disc mounting flange 32 on which the lowermost disc 8 in the disc stack is brought to rest. In accordance with the present invention, it is envisioned that the upper surface 32$a$ of the disc mounting flange 32 is also fabricated with an average surface roughness of approximately 12 micro inches. The spindle motor hub is commonly formed of aluminum which is first cast, forged or extruded, and then machined to achieve the necessary dimensional precision, with the desired flatness of the spindle motor flange 32 being achieved by turning the spindle motor hub. The desired average surface roughness is readily attained through an additional step after the flange has been machined to its desired flatness by applying an abrasive to the disc mounting flange while the spindle motor hub is still mounted for turning. In practice, a spindle motor hub formed of aluminum can be made to have a disc mounting flange with the desired average surface roughness by selection of appropriate machining and finishing processes and materials. Such selection is envisioned to be within the knowledge and experience of one of skill in the motor manufacturing art, and the particular process used to achieve the desired average surface roughness is not considered to be limiting to the scope of the present invention.

Yet another aspect of the present invention lies in control of the average surface roughness of the mounting area of the discs themselves. As was previously mentioned, it is common practice in the industry to manufacture discs with a minimal overall surface roughness of 0.2 to 0.5 $\mu$". This average surface roughness is selected to ensure proper cooperative operation with head sliders flying at specific nominal flying heights of approximately 1.50 $\mu$". A secondary manufacturing operation is then performed on the head landing zones (54 in FIG. 4) to increase the average surface roughness in this area to approximately 2 $\mu$" to prevent undesirable stiction between the heads and discs when power is removed and the heads are brought to rest on the head landing zone. As also previously mentioned, this secondary manufacturing operation can produce increased average surface roughness in the head landing zone by either abrasive or laser texturing.

Figure 8:
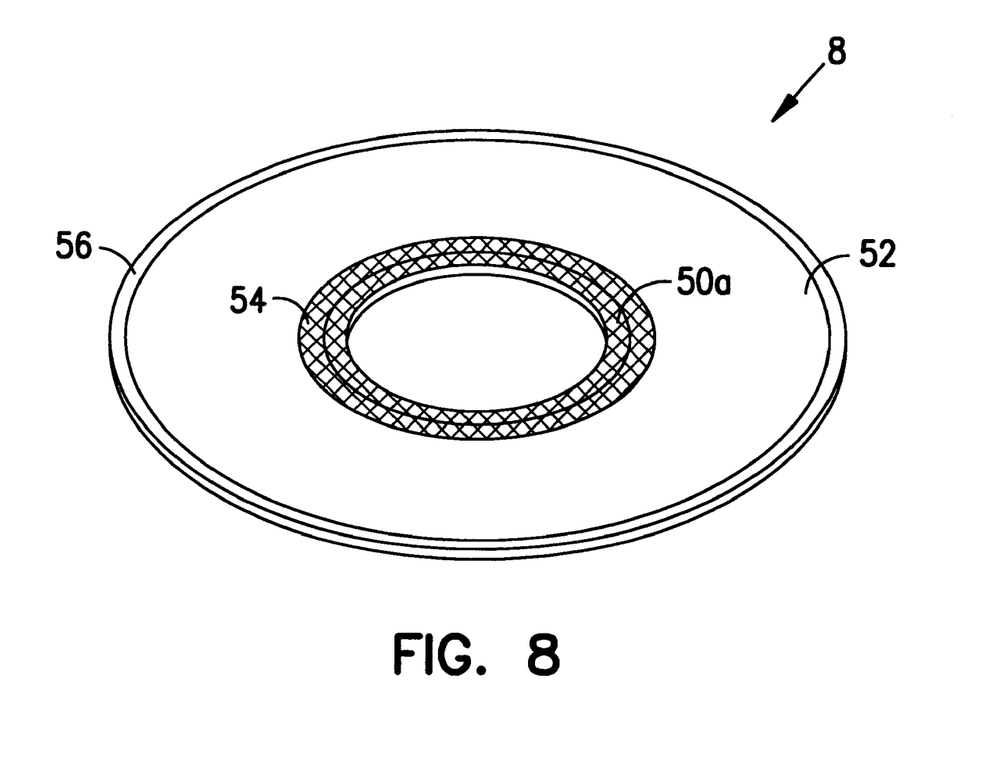
FIG. 8 is a perspective view of a disc which is modified in accordance with a fourth aspect of the present invention.

As shown in FIG. 8, the present invention envisions that the process used to increase the average surface roughness of the head landing zone 54 be extended to include texturing of the disc clamping portion 50$a$ of the discs 8. Extending the texturing of the head landing zone 54 into the disc clamping portion 50$a$ of the discs 8 will result in an increase in the coefficient of friction between the disc 8 and adjacent disc stack members, thus increasing the resistance of the discs to radial shifting relative to the spindle motor due to differential thermal expansion of the disc stack components or applied mechanical shock. Since the equipment and technology are already in place to texture the head landing zones 54 of the discs 8, extending the texturing to include the disc clamping portion 50$a$ of the discs 8 involves a minimum of additional tooling and manufacturing costs.

Yet another potential problem which can be addressed by the present invention is the maintenance of consistent clamping force applied by shrink-fit disc clamps, such as those described above in relationship to FIG. 2. It will be recalled that mounting of the shrink-fit disc clamp is accomplished by first heating the disc clamp to cause it to expand and then placing the disc clamp over the uppermost portion of the spindle motor hub in contact with the topmost disc in the disc stack and exerting the desired amount of clamping force axially against the disc stack, while allowing the disc clamp to cool and shrink into contact with the uppermost portion of the spindle motor hub.

Clearly, maintaining the intended disc clamping force requires that adequate frictional forces exist between the inner surface of the disc clamp and the uppermost portion of the spindle motor hub, and it will be appreciated by those of skill in the art that, if the inner surface of the disc clamp and the uppermost portion of the spindle motor hub are both especially smooth, low frictional force between these components could result in axial slippage of the disc clamp relative to the spindle motor hub, potentially drastically reducing the clamping force applied to the disc stack. Such a reduction in disc clamping force can increase the potential for shifting of the discs relative to the spin axis of the spindle motor, leading to the track-following difficulties noted above.

Figure 9A:
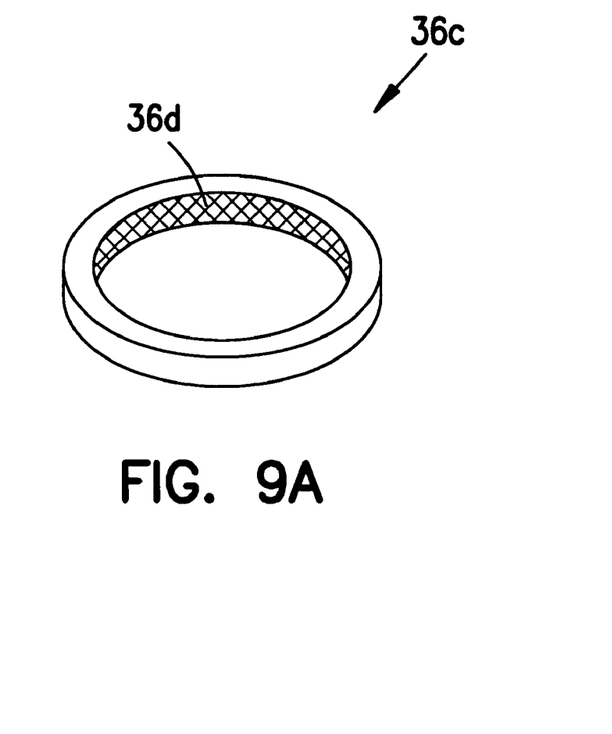
FIG. 9A is a perspective view of a shrink-fit disc clamp which is modified in accordance with a fifth aspect of the present invention.
Figure 9B:
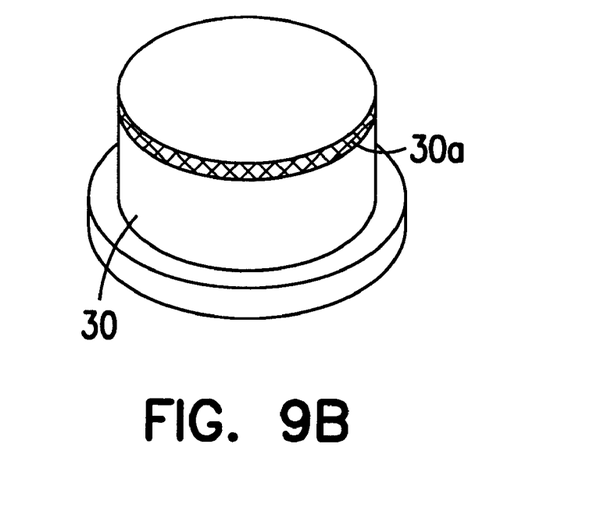
FIG. 9B is a perspective view of a spindle motor hub which is modified in accordance with a sixth aspect of the present invention.

Yet another aspect of the present invention is Illustrated in FIGS. 9A and 9B, which show modifications to a heat shrink disc clamp 36c and the hub 30 of the spindle motor, respectively, whereby increased resistance to changes in the clamping force applied to the discs is provided.

In FIG. 9A, the modified shrink-fit disc clamp 36c includes a motor hub contact surface 36d on its inner diameter which has a controlled average surface roughness selected to increase the coefficient of friction between the disc clamp 36c and the spindle motor hub. The average surface roughness of the motor hub contact surface 36d can be readily controlled through the use of etching or burnishing, as noted above, and, in the presently preferred embodiment, is again selected to be approximately 12 μinches.

FIG. 9B shows a spindle motor hub 30 which is modified to include a disc clamp contact surface 30a closely adjacent the uppermost extent of the disc hub 30. As envisioned by the present invention, this disc clamp contact surface 30a also has a controlled average surface roughness of approximately 12 μinches. leading to an increase in the coefficient of friction between the disc clamp and the spindle motor hub 30. Control of the average surface roughness of the disc clamp contact surface 30a can also be achieved using burnishing or etching, as noted above.

As will be appreciated by a person of skill in the art, an increase in the coefficient of friction between the disc clamp and the spindle motor hub can be achieved by increasing the average surface roughness of only the motor hub contact surface 36d of the heat shrink disc clamp 36c, or of only the disc clamp contact surface 30a of the spindle motor hub 30, or of both the motor hub contact surface 36d of the heat shrink disc clamp 36c and the disc clamp contact surface 30a of the spindle motor hub 30.

It will be appreciated by those of skill in the art that selection of combinations of certain of the above described aspects of the invention may well produce the optimum performance. For instance, texturing of the disc clamping portion of the discs in combination with texturing of the contact surfaces of the disc spacers may provide adequate resistance to disc shifting in one particular disc drive design, while a second disc drive design may require the above combination of component texturing as well as the texturing of the contact surface of the disc mounting flange of the spindle motor hub or the disc clamp or both. Therefore, the scope of the invention should not be considered to be limited by the elements or combination of elements which include the controlled average surface roughness noted herein.

Figure 10:
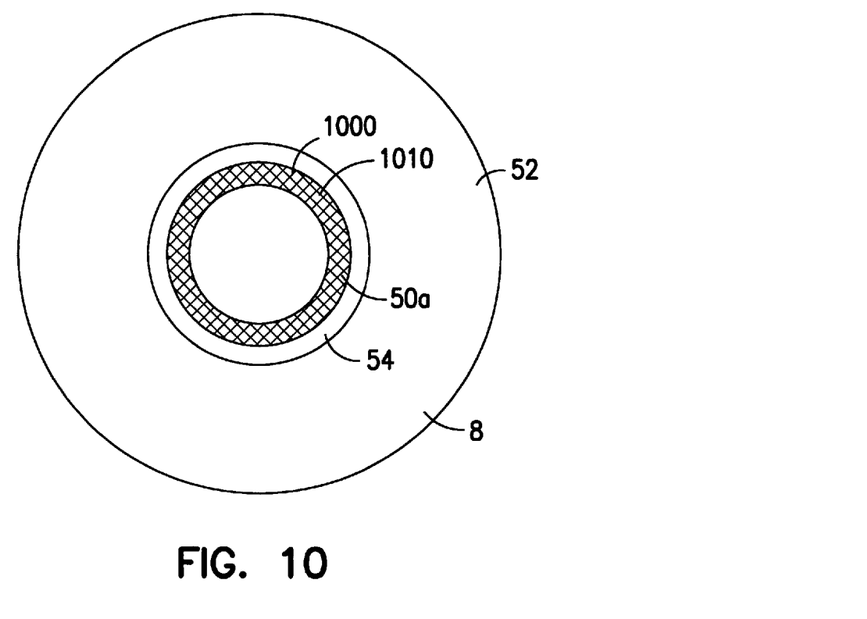
FIG. 10 shows a top view of a disc having bumps as raised features in the disc clamping region of the disc.

FIG. 10 shows a top view of a disc 8 having bumps 1000 as raised features 1010 in the disc clamping region 50a of the disc 8. The spacing of the bumps 1000 can be varied. In addition several or a multiplicity of the bumps 1000 can be put together to form a larger bump or a raised feature 1010. The bumps 1000 formed have a height of 100–150 nanometers (nm) above the disc surface which includes the first recording surface or data recording area 52 of the disc 8. The bumps 50a can be deposited onto the disc clamping surface 50a or they may be made from the material forming the disc 8. In a preferred embodiment the bumps 1000 are formed by the same process used to texture the landing zone 54. In the preferred embodiment the bumps 1000 are formed by a laser such as described for selectively texturing portions of recording discs as found in U.S. Pat. No. 5,062,021, issued Oct. 29, 1991 and U.S. Pat. No. 5,108,781, issued Apr. 28, 1992, both of which are assigned to the assignee of the present invention and incorporated herein by reference.

Advantageously, making the bumps 1000 or raised features 1010 using a laser adds a minimal amount of time to the manufacture of the disc 8. As mentioned in the patents listed above, a laser is used to texture the landing zone 54 of the disc. The process of forming a textured landing zone 54 using a laser requires that the disc be held in a tool where the laser can be directed toward the landing zone 54 of the disc. Bumps or raised features 1010 can be added by using the laser already used to form the textured landing zone 54. The bumps 1010 can be formed either at the same time or after the texture is formed for the textured landing zone 54. As a result, the manufacturing time needed for forming the raised features 1010 is minimal and may not include extra time since the same laser may be used at the same time to form the raised features 1010. In one preferred embodiment the bumps 1000 or raised features 1010 are formed using the exact same process as is associated with making the textured landing zone 54 of the disc 8. As a result, there is no additional set-up time for each disc since the same laser and the same power settings are used to form the bumps 1000 or raised features 1010.

Figure 11:
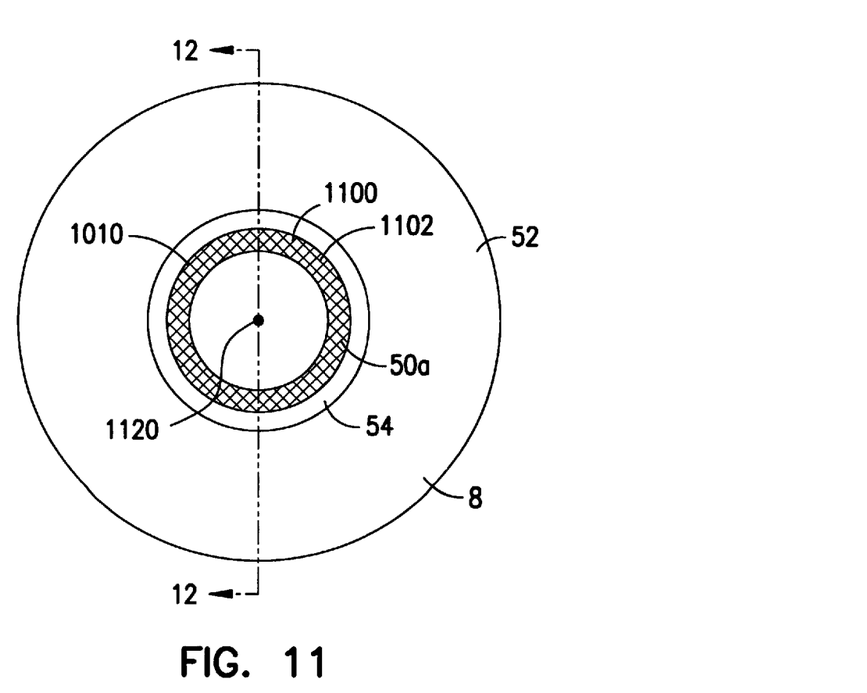
FIG. 11 is a top view of a disc having concentric rings as raised features in the disc clamping region of the disc.

FIG. 11 is a top view of a disc 8 having concentric rings about 1100 and 1102 in the disc clamping region 50a of the disc. The first ring 1100 and the second ring 1102 are concentric with the center line of the disc stack or center of the disc 1120. The first concentric ring 1100 and the second concentric ring 1102 are also raised features 1010. In other words, the concentric ring 1100 and the second concentric ring 1102 extend above the surface of the disc 8. More specifically, the first concentric ring 1100 and the second concentric ring 1102 extend above the surface of the disc in the range of 100–150 nm. The surface of the disc is substantially flat. The surface of the disc is essentially in the same plane as the data region 52 of the disc 8.

Figure 12:
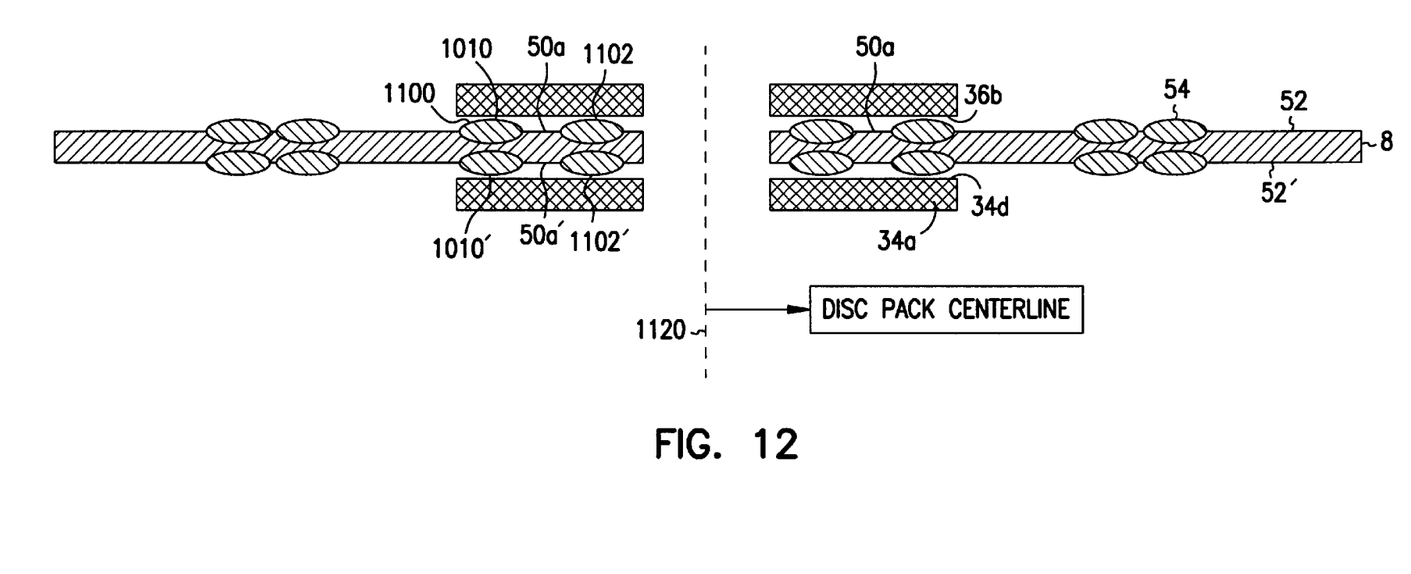
FIG. 12 is a cutaway section view of a disc having concentric rings as raised features in the disc clamping region of the disc along line 12—12 in FIG. 11.

FIG. 12 is a cutaway section view of a disc 8 having concentric rings 1100, 1102, as raised features 1010 in the disc clamping region 50a of the disc 8 along line 12—12 in FIG. 11. FIG. 12 also adds a disc clamp 36a and a disc spacer 34a, each of which is not shown in FIG. 11. The disc clamp 36a includes a disc contact surface 36b. This contact surface 36b may or may not be roughened. The disc clamp 34a also includes an upper disc contact surface 34d. The upper contact surface 34d may or may not be roughened. As can be seen the concentric rings 1100 and 1102 are raised features 1010 which extend above the surface of data surface 52 of the disc 8. As shown in FIG. 12, the disc 8 includes a first data surface 52 and a second data surface 52'. Each of the surfaces 52 and 52' of the disc 8 includes a raised feature. For example, as shown in FIG. 12 the second data surface 52' includes a disc clamping region 50a' which includes a concentric ring 1100' and a concentric ring 1102' which is associated with that surface. It should be noted that any type of pattern may be used to form the raised features 1010. In fact the concentric rings 1100 and 1102 and 1100' and 1102' are each made of individual bumps as defined by a laser. Other patterns could be equally effective and are considered within the scope of this invention.

Also noteworthy is the fact that the disc contact surfaces 36b and 34d of the clamp 36a and the disc spacer 34a, respectively may or may not be roughened. It is further contemplated that as the disc stack is formed using the disc with raised features 1010 in the clamping region 50a, the hub flange may also be roughened. It is also contemplated that the mounting flange 32 and specifically the upper surface 32a of the mounting flange may also be smoothed. Therefore in any given disc stack assembly, the individual components, namely the mounting flange 32 of the hub 30, the disc clamp 36a and the disc spacer rings 34a may either be roughened or smoothed on the surfaces where the components engage the disc clamping region 50a. It should also be noted that any combination of smooth or roughened surfaces may also be designed for a particular disc stack assembly.

In operation the raised features 1010 perform both elastically and plastically as the axial load is applied to the disc stack. The deformation takes up most of the flatness mismatch between the mating surfaces. In other words the raised features 1010 deform to accommodate tolerance mismatches in the flatness between the spacer rings, the spindle hub flange, the clamp ring, and the clamping regions of the disc 8. The end result is that there is a reduced level of distortion caused on the disc 8. In other words the amount of cupping or coning or potato chipping is reduced when raised features 1010 are provided in the clamping region 54 of the disc. In some instances the distortion is substantially eliminated. In all instances the invention allows better control of the disc geometry after applying the axial load and clamping the disc stack to the hub. The raised features 1010 provide controlled boundary conditions at the clamping zone 54 to maintain disc modes of known frequency over a large population of discs during manufacture. This improves the robustness of the drive level algorithms and control schemes as well as other design features.

Advantageously, the disc having raised features minimizes disc distortion resulting from clamping while also minimizing the amount of height of the disc stack. The raised features accommodate some of the tolerance mismatches of the other components of the disc stack. The result is that the disc distortions which effect the flatness of the data surfaces of the disc or discs are minimize. The raised features also allow for better control of the disc geometry results from assembling the disc into a disc stack. The raised features also allow the tolerances of the spacing rings and clamps to be made less stringent so that the cost associated with the various components are less. In addition, the control of the manufacturing process for assembling the disc stack is less stringent so the cost of assembly is also reduced.

Figure 13:
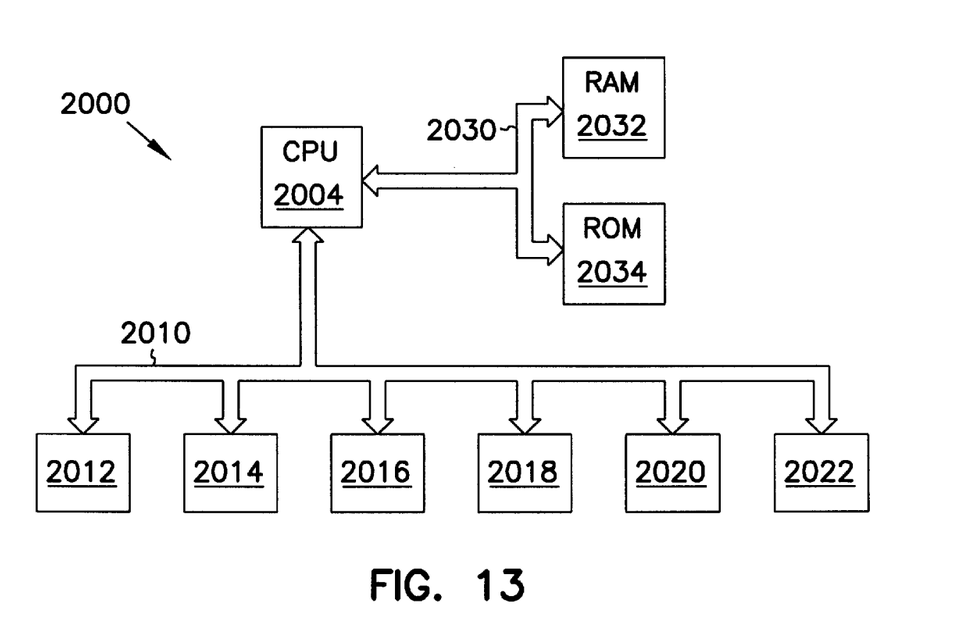
FIG. 13 is a schematic view of a computer system.

FIG. 13 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may have the roughened disc clamping surface which will control or prevent disc distortion when being assembled into a disc stack. Furthermore, any type of disc drive may use the roughened surface of a hub, clamps or spacers to increase the friction force between the spacer 210 and the disk 134.

From the foregoing, it is apparent that the present invention is particularly well suited and well adapted to achieve the objects set forth hereinabove, as well as other advantages inherent therein. While a particular combination of components and materials have been disclosed with regard to the presently preferred embodiments, certain variations and modifications may suggest themselves to one of skill in the art upon reading this disclosure. Therefore, the scope of the present invention should be considered to be limited only by the appended claims.

What is claimed is:

1. A magnetic disc drive comprising:
a substantially cylindrical hub having a first diameter, said hub including a mounting flange on one end of said hub, the mounting flange having a diameter greater than the first diameter;
a disc having an opening therein having a second diameter sufficient to allow the hub to fit within the opening of the disc, said disc having a first data surface and a second data surface; and
a clamp for attaching the disc to said hub, said disc including a disc clamping portion, said disc clamping portion further comprising a deformable feature for accommodating differences in flatness between the disc surfaces, the mounting flange of the hub and the clamp.

2. The magnetic disc drive of claim 1 wherein said deformable feature further comprises:
a first raised feature which extends above the first data surface; and
a second raised feature which extends above the second data surface.

3. The magnetic disc drive of claim 2 wherein the deformable feature includes a bump.

4. The magnetic disc drive of claim 2 wherein the deformable feature includes a bump defined by a laser.

5. The magnetic disc drive of claim 2 wherein the deformable feature includes a plurality of bumps forming a ring.

6. The magnetic disc drive of claim 2 wherein the deformable feature includes a plurality of bumps forming a ring, said bumps defined by a laser.

7. The magnetic disc drive of claim 2 wherein the deformable feature includes a ring.

8. The magnetic disc drive of claim 1 wherein the deformable feature includes a ring defined by a laser.

9. The magnetic disc drive of claim 2 wherein the deformable feature deforms during clamping to accommodate the mismatch in flatness between the disc surfaces, the mounting flange of the hub, and the clamp.

10. The magnetic disc drive of claim 2 wherein the disc clamp includes a roughened disc clamping surface.

11. The magnetic disc drive of claim 2 wherein the upper surface of the disc mounting flange is roughened.

12. A magnetic disc having an opening therein, said magnetic disc comprising:
a first data surface;
a second data surface; and
a disc clamping portion, said disc clamping portion near the opening in the magnetic disc, said disc clamping portion including:
a first raised, deformable feature which extends above the first data surface; and
a second raised, deformable feature which extends above the second data surface, said first and second deformable features allowing the clamping portion to accommodate for differences in flatness between opposingly clamped surfaces.

13. The magnetic disc of claim 12 wherein one of the first raised, deformable feature and the second raised, deformable feature includes a bump.

14. The magnetic disc of claim 12 wherein one of the first raised, deformable feature and the second raised, deformable feature includes a plurality of bumps forming a ring.

15. The magnetic disc of claim 12 wherein one of the first raised, deformable feature and the second raised, deformable feature includes a ring.

16. A method for clamping a disc to the spindle hub of a disc drive using a clamp which attaches to the hub, said hub substantially cylindrical in shape and having a mounting flange on one end, said disc having an opening therein for receiving the hub, said disc including a clamping portion near the opening, said method comprising:

forming a raised feature on the disc clamping portion of the disc;

applying an axial load to the clamp, disc and hub flange until the raised feature deforms;

and clamping the disc to the hub.

17. The method of claim 16 wherein applying an axial load to the clamp, disc and hub flange until the raised feature deforms results in the raised feature deforming elastically.

18. The method of claim 16 wherein clamping the disc to the hub further comprises:

heating clamp; and holding the clamp with respect to the hub until the clamp shrink fits to the hub.

19. The method of claim 16 wherein forming a raised feature on the disc clamping portion of the disc includes directing a laser at the disc clamping portion of the disc.

20. A magnetic disc having an opening therein, said magnetic disc comprising:

a data surface; and a disc clamping portion positioned near the opening in the magnetic disc, said disc clamping portion including conformable features, said conformable features allowing the clamping portion to accommodate for differences in flatness between opposingly clamped surfaces.

* * * * *